United States Patent [19]
Janke et al.

[11] Patent Number: 5,234,601
[45] Date of Patent: Aug. 10, 1993

[54] APPARATUS AND METHOD FOR CONTROLLING REGENERATION OF A WATER TREATMENT SYSTEM

[75] Inventors: Donald R. Janke, Milwaukee; Frank Kunesh, West Allis; Michael G. Busby, Madison, all of Wis.

[73] Assignee: Autotrol Corporation, Milwaukee, Wis.

[21] Appl. No.: 951,605

[22] Filed: Sep. 28, 1992

[51] Int. Cl.$^5$ .............................................. B01D 21/30
[52] U.S. Cl. ..................................... 210/662; 210/670;
210/746; 210/96.1; 210/138; 210/140; 210/143;
210/269; 364/502
[58] Field of Search ................ 364/500, 502; 210/662,
210/96.1, 143, 746, 670, 138, 269, 140

[56] References Cited

U.S. PATENT DOCUMENTS

| | | | |
|---|---|---|---|
| 3,159,573 | 12/1964 | Ritchie | 210/96.1 |
| 3,172,037 | 3/1965 | Pfeiffer | 324/30 |
| 3,172,037 | 3/1965 | Pfeiffer | 210/662 |
| 3,246,759 | 4/1966 | Matalon | 210/662 |
| 3,383,310 | 5/1968 | Ammer | 210/25 |
| 3,618,769 | 11/1971 | Iglesias | 210/96.2 |
| 3,676,336 | 7/1972 | O'Brien | 210/25 |
| 3,768,649 | 10/1973 | Fleckenstein | 210/96.1 |
| 3,838,774 | 10/1974 | Dolan et al. | 210/85 |
| 3,869,382 | 3/1975 | Tejeda | 210/30 |
| 3,964,999 | 6/1976 | Chisdes | 210/23 R |
| 4,257,887 | 3/1981 | Rak et al. | 210/96.1 |
| 4,299,698 | 11/1981 | Rak et al. | 210/96.1 |
| 4,320,010 | 3/1982 | Tucci et al. | 210/96.1 |
| 4,426,294 | 1/1984 | Seal | 210/662 |
| 4,491,798 | 1/1985 | Palmer et al. | 324/425 |
| 4,814,090 | 3/1989 | Kunz et al. | 210/143 |
| 4,847,598 | 7/1989 | Tucci et al. | 210/96.1 |
| 4,917,794 | 4/1990 | Fettes et al. | 210/140 |
| 5,022,994 | 6/1991 | Avery et al. | 210/670 |
| 5,073,255 | 12/1991 | Chili et al. | 210/96.1 |

FOREIGN PATENT DOCUMENTS 2460351 12/1974 Fed. Rep. of Germany .

Primary Examiner—Stanley S. Silverman
Assistant Examiner—Cynthia L. Nessler
Attorney, Agent, or Firm—Quarles & Brady

[57] ABSTRACT

A water treatment apparatus has a tank that contains a resin bed through which water flows. The apparatus is controlled by occasionally measuring the conductivity of the resin bed at two spaced apart locations to produce first and second conductivity measurements. The ratio of the two conductivity measurements is calculated periodically. The present ratio value, along with the minimum and maximum ratio values that occurred since a previous regeneration of the resin bed, are used to determine the movement of an exhaustion front through the resin bed. A probability of exhaustion also is determined and when that probability exceeds a given value, regeneration of the resin bed is initiated. The conductivity measurements are used to determine if the resin bed has lost efficiency and in which event a warning signal is sent to the user. During regeneration, the conductivity at one of the locations in the resin bed is monitored to detect whether a regenerant has entered the tank; if not another warning signal is sent to the user.

24 Claims, 3 Drawing Sheets

APPARATUS AND METHOD FOR CONTROLLING REGENERATION OF A WATER TREATMENT SYSTEM

BACKGROUND OF THE INVENTION

The present invention relates to apparatus for softening water; and particularly to systems for controlling the regeneration of the resin of the water softener.

It is not uncommon for water that is drawn from a well to be considered "hard" in that it contains di-positive and sometimes tri-positive ions which have leached from mineral deposits in the earth. Such ion form insoluble salts with common detergents and soaps producing precipitates that require an increased quantity of detergent or soap for cleaning purposes. When hard water is used in boilers evaporation results in the precipitation of the insoluble residues which tend to accumulate as scale.

It is common practice to install a water softener in the plumbing system of a building that is supplied with hard water. The most common type of water softener is an ion exchange resin-type softener having a tank which holds a bed of resin through which the hard water is passed to remove undesirable minerals and other impurities. Initially binding sites in the resin bed contains positive ions, commonly unipositive sodium or potassium ions. As hard water enters the resin, competition for the binding sites occurs. The di-positive and tri-positive ions in the hard water are favored due to their higher charge densities and displace the unipositive ions. Two or three unipositive ions are displaced for each di-positive or tri-positive ion, respectively.

The capacity of the rein bed to absorb minerals and impurities is finite and eventually ceases to soften the water when a large percentage of the sites are occupied by the di-positive and tri-positive ions. When this occurs, it becomes necessary to recharge or regenerate the resin bed by flushing it with a regenerant, typically a solution of sodium chloride or potassium chloride. The concentration of unipositive ions in the regenerant is sufficiently high to offset the unfavorable electrostatic competition and the binding sites are recovered by unipositive ions. The interval of time between regeneration periods during which water softening takes place is referred to as a "service cycle."

Regeneration of early types of water softeners was affected manually only after it was discovered that the treatment capacity of the resin bed has been exceeded and the water flowing therethrough is not longer soft. In an effort to eliminate the need for manual regeneration, water softener control systems were developed utilizing a mechanical clock which initiated water softener regeneration on a periodic basis. The frequency of such regeneration was set in accordance to the known capacity of the resin bed and the anticipated daily usage of soft water. While mechanical clock-type water softener controllers have alleviated the need for manually regenerating the resin bed, such controllers are subject to the disadvantage that by regenerating at fixed intervals, regeneration may occur too often or too late depending upon water usage. Regenerating the water softener resin bed when sufficient capacity to treat water still exists is wasteful of the regenerant and the water used in regeneration. Conversely, failure to regenerate the water softener after the resin bed capacity has diminished to a point below that required to treat hard water results in hard water leaving the water softener.

In an effort to better regulate the frequency of water softener resin bed regeneration, demand-type water softener control units have been developed which determine the remaining capacity of the water softener resin bed to soften water. One type of such an improved controller is disclosed in U.S. Pat. No. 4,426,294 in which a flow meter measures the volume of water being treated and regenerates the resin bed when a specified volume of water has flowed through the softener since the previous regeneration. While this type of system is adequate in many installations, municipal systems alternately may draw water from several wells which contain water having different degrees of hardness. In this case, the exhaustion of the resin bed is not a direct function of the volume of water which has been treated since the previous regeneration.

Other types of control systems were developed which attempted to measure the exhaustion of the resin bed directly. For example, U.S. Pat. No. 4,320,010 placed electrodes in the resin bed to detect an electrical voltage generated by the resin bed. This voltage changed when the resin bed became exhausted, thus providing a mechanism by which the controller could determine when regeneration was required. Another control technique measured the conductivity between two pairs of electrodes placed at different levels in the resin bed. The difference in conductivity between the two locations in the resin bed was used to determine when exhaustion of the water softener had occurred. A system of this type is disclosed in U.S. Pat. No. 4,299,698. A similar technique is described in U.S. Pat. No. 3,618,769 in which the ratio of the conductivity of two locations in the resin bed is used to determined when regeneration should take place.

SUMMARY OF THE INVENTION

A water treatment apparatus has a tank with an inlet, an outlet and contains a resin bed through which water flows from the inlet to the outlet. First and second conductivity sensors are placed in the resin bed at two locations spaced apart along the path of the water flow between the inlet and the outlet. A means periodically produces a value which corresponds to the ratio of the conductivity measurements from the two sensors. Ratio values are used to calculate the probability that an exhaustion front has passed the first conductivity sensor, and subsequently to calculate another probability that the exhaustion front has passed the second conductivity sensor. A probability of resin bed exhaustion also is calculated from the conductivity ratio and when this latter probability exceeds a threshold value, a mechanism is activated to regenerate the resin bed.

In the preferred embodiment, the conductivity at the locations in the resin bed is monitored during regeneration to determine if a regenerant has entered the tank. If not, a warning signal is sent to the user.

A check is made to determine whether the current ratio is within an operational range of values. When the ratio is outside that operational range, one or both of the conductivity cells is faulty and a signal is sent to the user indicating a problem with the controller.

An object of the present invention is to provide a water treatment system that controls the regeneration of the resin bed based on the conductivity of the bed. This technique detects the degree of exhaustion, which indicates the resin bed's ability to treat water.

Another object is to provide such a control function by measuring the conductivity at two locations in the resin bed and to employ the ratio of the two conductivities in determining when regeneration should occur.

A further object of the present invention is to compare the ratio of conductivities to a threshold that is adapted to the characteristics of the specific water treatment system and of the water being treated.

DETAILED DESCRIPTION OF THE INVENTION

Figure 1:
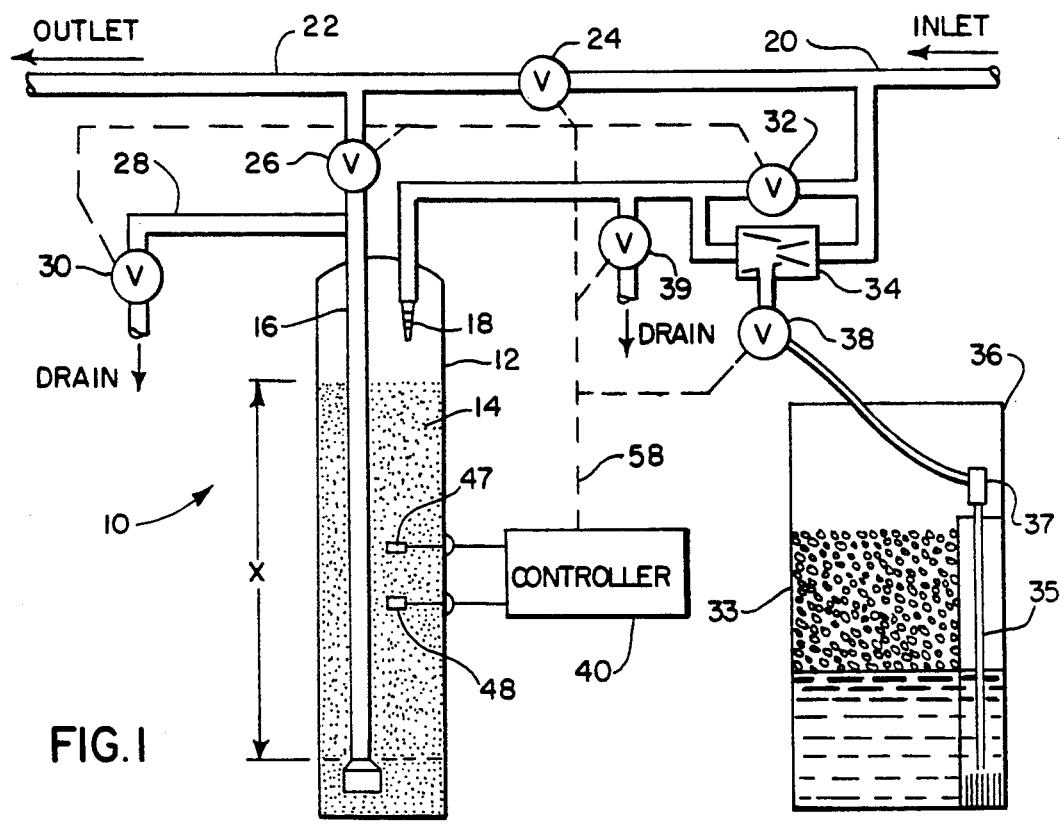
FIG. 1 is a schematic view of a system for regenerating a water softener according to the present invention.

Referring initially to FIG. 1, a water softener 10 includes a softening tank 12 which contains a bed 14 of ion exchange resin particles. An outlet tube 16 extends through the bed 14 from a point adjacent the bottom of the bed. An inlet pipe 18 extends into the water softener tank 12 and has a discharge opening above the level of the resin bed 14. Hard water is delivered through an inlet line 20 and treated water is delivered through a service line 22. The inlet line and the service line are connected through a normally closed valve 24. A second service valve 26 is interposed between the outlet tube 16 and the service line 22. A drain line 28 containing a normally closed first drain valve 30 also extends from the outlet tube 16.

Hard water can be delivered to the inlet pipe 18 through a service inlet valve 32. Alternatively, hard water entering the inlet line 20 can pass through an injector 34 to draw a regenerant solution from a brine tank 36 when a brine inlet valve 38 is opened and when the service inlet valve 32 is closed. The brine tank 36 contains a common salt 33, such as a sodium chloride or potassium chloride. The withdrawn brine is delivered through line 35 to the inlet pipe 18 of the softener. The inlet pipe 18 also is connectable to a drain through a normally closed second drain valve 39.

During service operation, the drain valves 30 and 39, the first service valve 24 and the brine inlet valve 38 are all closed. In this mode of operation, the second service valve 26 and the service inlet valve 32 are open allowing hard water to flow from the inlet line 20 through the inlet pipe 18 onto the top of the resin bed 14. The water passes through the bed 14 and treated water is withdrawn from the bottom of the bed 14 through outlet tube 16 and into the service line 22.

The resin bed 14 will eventually become exhausted. In a typical softening process, this means that the resin bed has changed from a sodium to a calcium/magnesium condition. A typical regeneration of resin bed 14 commences with a backwash step. In this step, a control unit 40, that is mechanically connected to the valves, closes the service inlet valve 32 and the brine inlet valve 38; while opening the first service valve 24 and the second drain valve 39. Hard water from the inlet 20 feeds through the outlet tube 16 and upwards through the resin bed 14 finally exiting through the inlet pipe 18 and the now open second drain valve 39. Water continues to be supplied to the service line 22 at this time even though it is not being treated.

The backwash is followed by a brining and rinse. For this operation, the second service valve 26 and the second drain valve 39 are closed while the brine inlet valve 38 and the first drain valve 30 are opened. In this state, hard water is forced through the injector 34 and brine is withdrawn from the tank 36 through a brine line 35. The withdrawn brine is discharged into the softener tank 12 through inlet pipe 18. The brine passes through the resin bed 14 and drains through the outlet tube 16 and the now open first drain valve 30. The concentrated brine solution replaces the di-positive and tri-positive ions in the resin with unipositive ions recharging the bed. When the contents of the brine tank 22 have been exhausted, an air check valve 37 closes to prevent air from being injected into the system and water will continue to flow through the injector 34 free of brine. This water propels the brine solution from the tank and then rinses the bed 14 to remove residual brine. Untreated water will be supplied to the service line 22 through the open valve 24 during this stage of operation.

During the next stage of operation, the brine tank 36 is refilled and the softener resin bed 14 is purged. This is accomplished by opening the service inlet valve 32 and the second service valve 26. Hard water then can enter the brine tank 36 through the open brine valve 38 and can enter the tank 12 through the inlet pipe 18. Water passing through the resin bed 14 exits through the open drain valve 30. The apparatus is returned to a service condition by closing the first service valve 24, the first drain valve 30 and the brine inlet valve 38.

Figure 2:
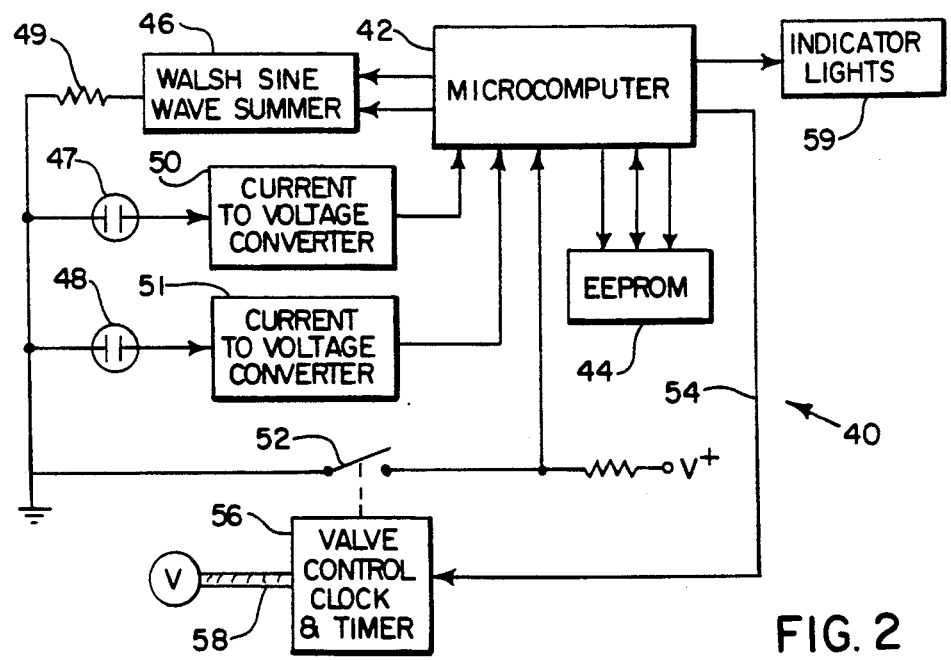
FIG. 2 is a schematic block diagram of the controller in FIG. 1.

Referring to FIG. 2, the controller 40 which operates the various valves illustrated in FIG. 1 is built around a microcomputer 42. The microcomputer can comprise any one of several commercially available devices, such as a model MC68HC705P9 manufactured by Motorola, Inc., which contain internal analog-to-digital converters, random access memory, read only memory, and clock circuits. An electrically erasable programmable read only memory (EEPROM) 44 is connected to the microcomputer 42 for the storage and retrieval of data.

Other outputs of the microcomputer 42 are connected to a Walsh sine wave summer 46 as described in an article entitled "Walsh Functions: A Digital Fourier Series" which appeared in *Byte Magazine* September 1977, pages 190–198, which is incorporated by reference herein. The output of the Walsh sine wave summer 46 is low pass filtered to remove high order harmonics leaving an essentially pure sine wave at a frequency of approximately 1,000 Hz. with an amplitude of approximately 100 mv-pk. The low excitation voltage is selected to prevent chemical reduction or oxidation from occurring at electrodes in the resin bed. A relatively high excitation frequency was selected to reduce the electrode double layer capacitance.

The output signal from the Walsh sine wave summer 46 is applied to common electrodes of two conductivity probes, or cells, 47 and 48 located within the resin bed 14. The lower probe 48 is located at approximately thirty-eight percent of the effective height (X) of the bed which is the distance between the uppermost inlet opening at the bottom of outlet tube 16 and the top of the resin bed. The position was chosen so that the lower conductivity probe 48 will produce a indication of a conductivity change when approximately twenty percent of the capacity of the resin bed remains to treat water. It has been discovered that when the interface between exhausted and unexhausted sections of the resin bed drops to approximately thirty-eight percent of the effective height of the resin bed, eighty percent of the resin's capacity to treat water has been exhausted. This is contrary to intuitive reasoning which would indicate that the eighty percent depletion point would correspond to a level of approximately twenty percent of the effective height of the resin bed. The upper conductivity probe 47 is positioned in the resin bed approximately six inches above the lower probe 48.

Figure 3:
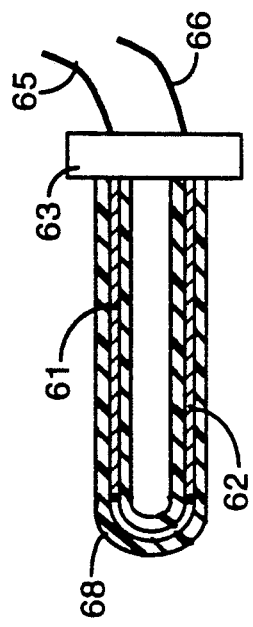
FIG. 3 illustrates a conductivity sensing probe that is used with the controller in FIG. 2.

Referring to FIG. 3, each of the conductivity probes 47 and 48 comprises a pair of electrode rods 61 and 62 embedded in a plastic block 63. Inside the block, each of the electrodes 61 and 62 connect to two wires 65 and 66 which extend to controller 40. The electrodes 61 and 62 are fabricated of gold plated, stainless steel. The stainless steel of the electrode structure resists corrosion, while the gold plating makes the surface chemically inert. However, the gold resists wetting by the water within the tank 12. In order to improve the wetting, a sleeve 68 of an ion exchange material, such as Nafion (trademark of E.I. du Pont de Neumours & Co., Inc.)is bent into a U-shape and inserted over each of the electrodes. The ends of the U-shaped sleeve are secured to the plastic block 63. The sleeve 68 "wets" the hydrophobic gold surface and keeps macro-molecules away from the electrode surface, thereby further stabilizing and preventing electrode contamination. The sleeve 68 also protects the relatively soft gold surface from abrasion. Alternatively, a separate sleeve of ion exchange material can be placed over each electrode 61 and 62. As a further alternative, another noble metal which is inert to corrosion may be used in place of gold to plate the electrode. In addition, a graphite rod may be used as the electrode and would not require plating.

Referring once again to FIGS. 1 and 2, the non-common electrode of each of the conductivity probes 47 and 48 is connected to a separate current-to-voltage converter 50 and 51, respectively. Each of these converters 50 and 51 transforms the magnitude of the current flowing through the associated probe 47 or 48 into a corresponding voltage level. The voltage outputs from the current to voltage converters 50 and 51 are applied to inputs of the microcomputer 42 which are connected to internal analog-to-digital (A/D) converters. As will be described, the microcomputer periodically enables each A/D converter in order to read the magnitude of the voltage produced by the corresponding current-to-voltage converter.

Another input line to the microcomputer 42 is connected to a service switch 52 which is closed whenever a regeneration of the water softener 10 is occurring. A set of indicator lamps 59 are activated by the microcomputer 42 as will be described, to provide indications to the user of events such as depletion of the salt in the brine tank 36 and probe failure. Other types of signalling devices, such as audible alarms, can be used.

The microcomputer 42 executes a control program which detects the current flowing through the conductivity probes to determine when the resin bed 14 requires regeneration. Whenever the control program from the microcomputer 42 determines that regeneration is required, a control signal is sent via line 54 to a conventional valve control clock and timer 56. This latter component 56 is similar to ones used in previous water softeners which regenerated the resin bed at a periodic interval and at a time of day (e.g. 2 a.m.) when water use is minimal. However, the valve control clock and timer 56 will initiate regeneration of the resin bed 14 at that time of day only when a control signal is being received over line 54. If these conditions are met, the valve control clock and timer 56 rotates a cam shaft 58 which opens and closes the different valves illustrated in FIG. 1 in the sequence previously described to regenerate the resin bed. The valves and the valve control clock and timer 56 are similar to a valve module manufactured by Autotrol Corporation, Glendale, Wis. under part number 24N and shown in U.S. Pat. No. 4,426,294.

Figure 5:
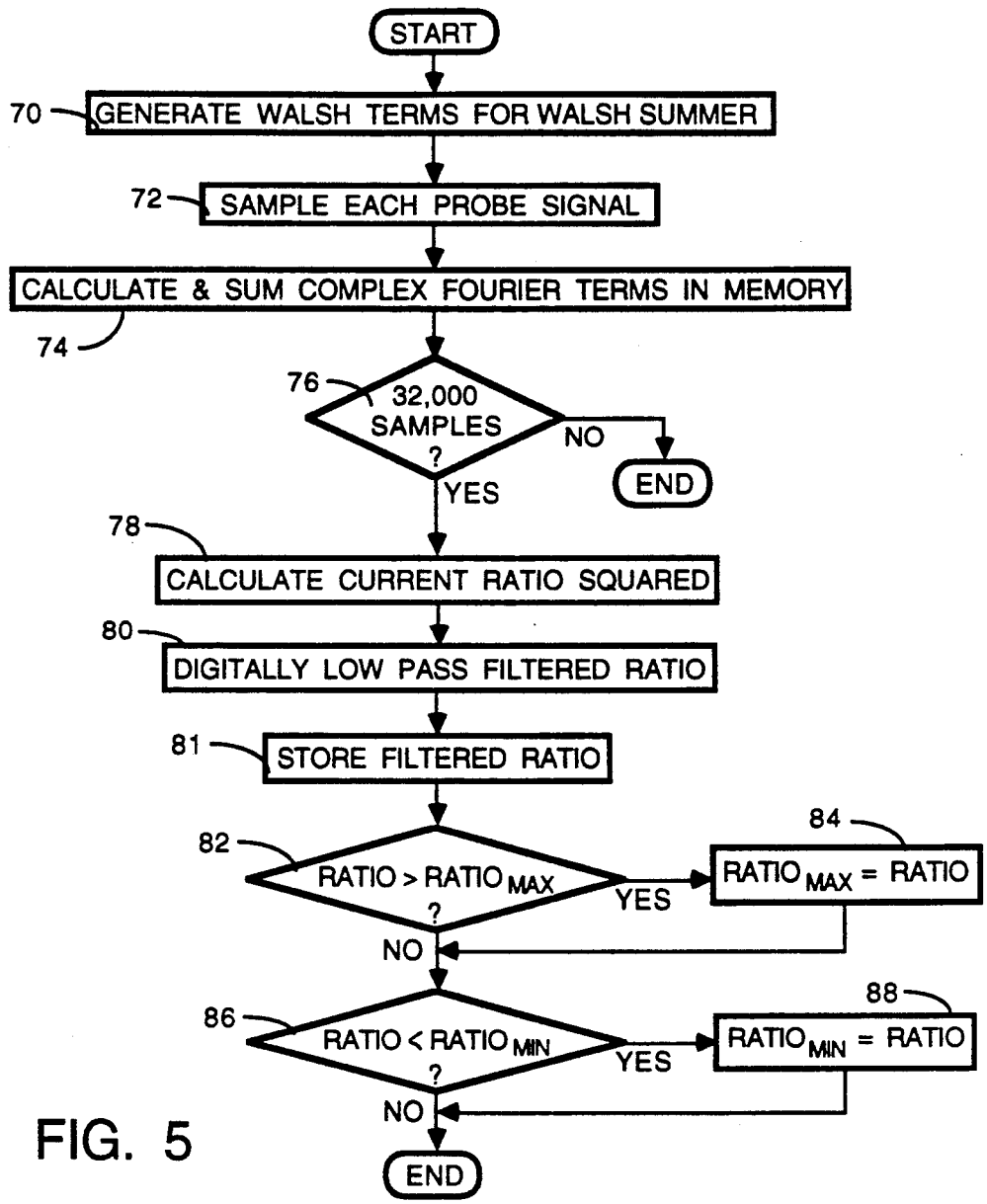
FIG. 5 is a flowchart of a routine that is executed by a microcomputer in the water softener controller to periodically sample the conductivity at two locations in the softener resin bed.

During operation of the controller 40, its microcomputer 42 is interrupted periodically by a timed interrupt to execute a conductivity sampling routine depicted by the flowchart in FIG. 5. At the first step 70 of this routine, the microcomputer 42 sends a digital Fourier term to the Walsh sine wave summer 46. Eight digital Fourier terms are sent for each sine wave cycle. The Walsh sine wave summer 46 responds by generating an approximation of a 1,000 Hz. sine wave having an amplitude of 100 millivolts peak to peak, for example. Because square waves are supplied by the microcomputer 42 to the sine wave summer 46, only high order odd harmonics are present in the output which can easily be removed by a low-pass filter within the summer to give an essentially pure sine wave output. The output of the sine wave summer 46 is fed through a 100 ohm resistor 49 which is connected in series between the output of the sine wave summer and the common electrode of the two conductivity probes 47 and 48. The resistor 49 increases the dynamic range of the conductivity signal because the voltage applied to the electrodes decreases as the current increases.

The common electrodes of the probes 47 and 48 also are connected to earth ground to remove any stray currents at the A.C. supply frequency which could otherwise decrease the dynamic range of the sensing and cause false readings. The signal applied to the common electrode of the two conductivity probes 47 and 48 is conducted through the sleeve 68 and the resin bed to the other electrode. The relatively low exciting voltage does not promote chemical reduction of the electrodes and the relatively high frequency reduces the effect of the double layer capacitance so that the electrodes will appear as a short circuit. The current which flows through the probes 47 and 48 is directly proportional to the conductivity of the resin bed and thus can be used as an indicator of that conductivity. The current-to-voltage converters 50 and 51 produce output signals having a voltage level that corresponds to the magnitude of the current flowing through the associated probe and the output signals are applied to A/D converter inputs of the microcomputer 42. The current-to-voltage converters 50 and 52 contain low pass filters to remove frequencies above the Nyquist frequency for proper digital signal processing.

At step 72 in FIG. 5, the microcomputer samples the signal from each conductivity probe 47 and 48 by digitizing the input signals received from the current-to-voltage converters 50 and 51 synchronously with the signal produced by the Walsh sine wave summer 46. The sampling rate is selected to acquire eight samples of the conductivity probe current during each cycle of the 1,000 Hz. excitation signal. Since the signal generation and sampling are phase coherent, the microcomputer 42 tends to reject samples of spurious signals that were not generated by the Walsh sine wave summer 46. The sampled current data are multiplied by the sine and cosine of the phase angle of the output signal from the summer 46 at step 74. The resultant sine and cosine terms are summed into registers of the microcomputer 42 for the real ($I_{real}$) and imaginary ($I_{imag}$) current values for the appropriate conductivity probe. A determination then is made by the microcomputer 42, at step 76, whether 32,000 conductivity samples (4,000 signal cycles) have been summed, during this service cycle, into the complex Fourier coefficients for the currents from both probes 47 and 48. If not, the sampling routine terminates until the next timed interrupt.

The total current (I) of a conductivity probe is given by $$I = k \sqrt{I_{real}^2 + I_{imag}^2}$$

and is directly proportional to the conductivity of the fluid surrounding the probe. The k is a scaling factor representing the gain of the current to voltage amplifier, an analog to digital scaling factor and the Fourier coefficient scaling. Once at least 32,000 samples from each conductivity probe 47 and 48 have been acquired, execution of the sampling routine advances to step 78 where the ratio of the real and imaginary current sums for each probe is calculated according to the expression:

$$I_R^2 = \frac{I_{1\,real}^2 + I_{1\,imag}^2}{I_{2\,real}^2 + I_{2\,imag}^2}$$

where $I_1$ is the current from the lower probe 47 and $I_2$ is the current from the upper probe 48, for example. The value of $I_R^2$ is directly proportional to the square of the ratio of the currents and directly proportional to the square of the ratio of conductivity of the two conductivity probes. By using the square of the ratio, the microcomputer 42 does not have to perform the involved process of calculating the square roots. The resultant current ratio $I_R^2$ is digitally low pass filtered by microcomputer 42 at step 80 to remove relatively fast changing factors, such as differential temperature changes across the probes caused by cold water flowing into a warm resin tank. The filtered ratio is stored within the microcomputer's memory at step 80.

Then a determination is made whether the value of the new current ratio $I_R^2$ is the largest or the smallest value that has occurred during the present service cycle. Specifically at step 82 the value of the new current ratio is compared to the previous maximum ratio value that is stored in the microcomputer's memory. When a new current ratio value is greater, it replaces the previous maximum ratio value in memory at step 84. Then the value of the new current ratio $I_R^2$ is compared to the previous minimum ratio value at step 86, and replaces that previous value at step 88 if the new current ratio is lower in magnitude.

Figure 6:
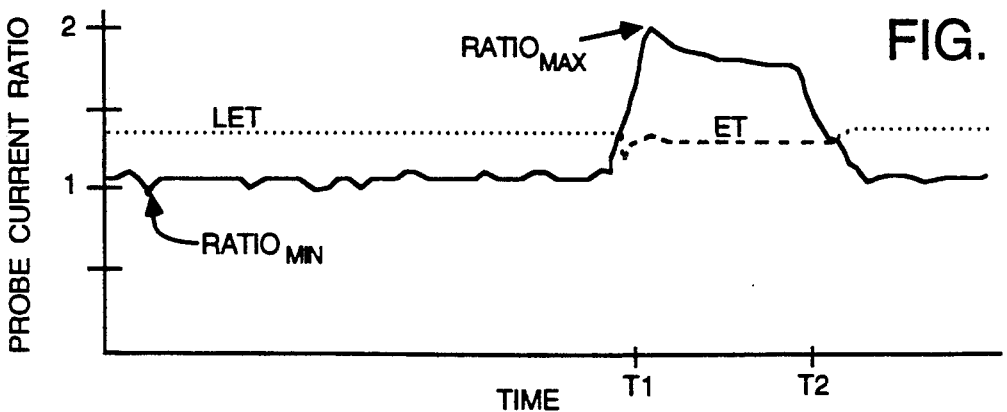
FIG. 6 is a graph of the ratio of electrical current flowing through two conductivity probes in the resin bed.

The ratio of the currents in the two conductivity sensors determines the state of operation for the water softener controller 40. In order to understand that operation, reference is made to FIG. 6 which shows the ratio of the currents from the two conductivity probes 47 and 48 throughout a typical water softener service cycle of several days. Although the conductivity probes have been designed to minimize their susceptibility to corrosion and chemical reaction with the minerals in the water, a certain degree of contamination of the probes occurs over time. As the contamination of the two probes often is unequal, the ratio of their currents may not be unity even when the conductivity of the resin bed at the two probe locations is the same. This is illustrated in the exemplary graph prior to time T1.

Untreated water enters at the top of the softening tank 12 and the ability of the upper portion of the resin bed 14 to soften the water becomes exhausted first. As the exhaustion continues, an interface, or front, between the exhausted and unexhausted resin moves downward through the bed over time. Eventually at time T1, the exhaustion front moves past the upper conductivity probe 47. As indicated on the graph in FIG. 6, the conductivity of this probe changes, thereby producing a dramatic increase in the ratio of the currents flowing through the two probes 47 and 48. This increase produces a leading edge in the ratio waveform at approximately time T1. The extent to which this ratio increases will vary depending upon a number of factors, such as the capacity of the resin to attract positive ions, and the values illustrated in the graph are exemplary only. The exhaustion front continues to move downward through the resin bed 14, reaching the lower probe 48 at time T2. As a result, the conductivity of this probe changes and the ratio $I_R^2$ of the probe currents decreases. As will be described, it is this decrease in the current ratio, referred to as the trailing edge of the ratio waveform, which triggers a regeneration of the resin bed 14. Thus, a short time after T2, the resin bed 14 has been recharged and the ratio of the two conductivity probes once again approaches unity.

The use of the ratio of the currents flowing through the two conductivity probes 47 and 48 is preferable to prior systems which utilized merely the difference between the two currents. The ratio minimizes the effects due to a change in the conductivity of water entering the softening tank 12, as may occur when a municipal water system switches between shallow and deep wells. The ratio method also reduces the effects of temperature variation on the conductivity measurement by the two probes. If water has not been required for a period of time, the water in the softener will be relatively warm. Thereafter when a large amount of water is used, colder water directly from a well may enter the softening tank 12 producing a large change in the temperature of the conductivity probes. Although such temperature variations affect the absolute conductivity measurement, their effects are cancelled by the ratio process. It is well known that the conductivity of each probe 47 and 48 also is a function of a "cell constant" which is determined by the spacing and the length of the cell's electrodes. As these physical characteristics and degree of contamination vary between conductivity probes, each conductivity probe 47 and 48 may have a slightly different cell constant. The effects produced by differing cell constants also are reduced by the present method.

Figure 4:
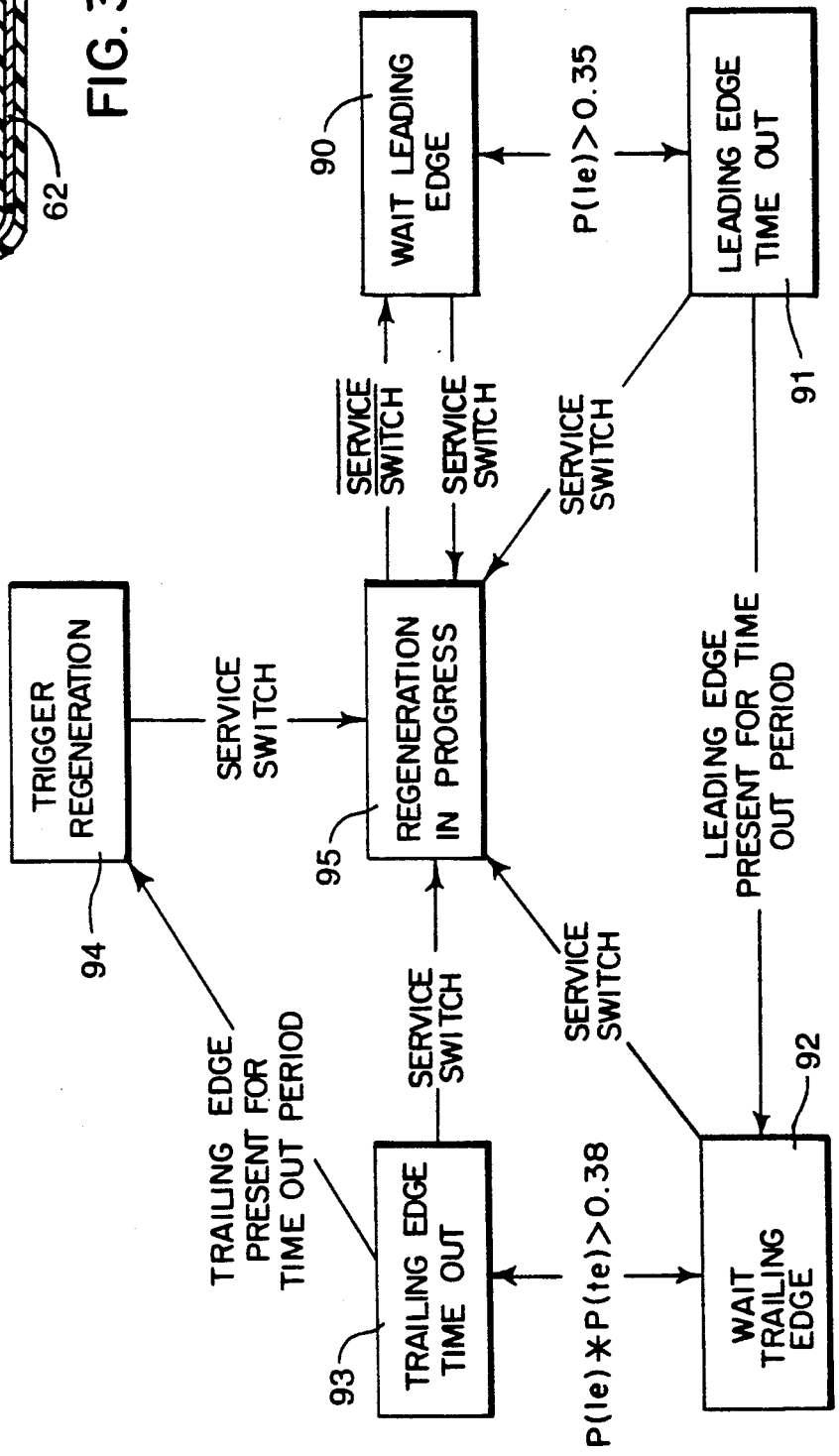
FIG. 4 is a state diagram of the operation of the water softener controller.

Aside from the interrupt routine which performs the sampling of the current signals from the conductivity probes 47 and 48, the microcomputer 42 operates as a state machine in performing the control of the water softener regeneration. The state machine has six states as illustrated in FIG. 4. Assume that the water softener has been regenerated recently and the conductivity ratio is close to unity. At this time, the resin bed exhaustion front has yet to reach the upper conductivity probe 47 and the state machine is in the state 90 waiting for the leading edge of the current ratio pulse which occurs at time T1.

In order to detect when the leading edge occurs, the microcomputer 42 determines the probability P[le] that a leading edge has occurred using the following equation:

$$P[le] = \frac{\text{Present Current Ratio}}{3 \text{ (Minimum Ratio Value)}}.$$

If the value of P[le] is greater than one then the value is set equal to one; and when P[le] is less than a leading edge threshold (e.g. 0.35), it is set equal to zero. This leading edge threshold (LET) is depicted by a dotted line in FIG. 6. Alternatively, instead of using the minimum ratio value to determine P[le], an average of the ratios computed since the last resin bed regeneration can be employed. The use of the ratio average precludes spikes in the current ratio waveform from significantly affecting the regeneration trip point.

The ratio of the present current ratio $I_R^2$ to the minimum ratio value has been found to be relatively insensitive to differing cell constants of the two probes 47 and 48. Conductivity cell constant differences are multiplying factors for the current ratios. However, by using a ratio of the probe current ratios to define the leading edge probability P[le], effects of different conductivity cell constants are cancelled out of the computation.

Referring once again to the state machine diagram in FIG. 4, the microcomputer 42 waits at state 90 for the value of the leading edge probability P[le] to exceed zero as occurs when the leading edge threshold is transcended. Until that time, the microcomputer remains in state 90 and uses each new value of the current ratio $I_R^2$ to recalculate P[le].

Once the microcomputer 42 determines that the leading edge probability P[le] is non-zero, a transition occurs from state 90 to state 91. In this new state, the microcomputer 42 continues to calculate P[le] for a given period of time, for example one or two hours. If during this period the value of P[le] drops below the leading edge threshold (P[le]=0), the microcomputer 42 transitions back to state 90 to once again wait for a leading edge. By waiting at state 91 to insure that P[le] remains above the leading edge threshold for a period of time, spurious short term increases in the current ratio $I_R^2$ will not result in premature regeneration of the softener 10. For example, it has been found that the exhaustion front often drops in the tank 12 during water usage and then rises when the flow ceases.

Whenever a transition is made from one state to another, microcomputer 42 stores a designation of the new state in a location within the EEPROM 44. Should a power failure occur, the non-volatile memory provided by the EEPROM 44 retains the state designation. Upon restoration of power, the microcomputer 42 executes a power-up sequence that checks this EEPROM storage location to determine the state in which to commence operating. This process insures that a power outage will not affect the normal cycling of the water softener control. Thus if a determination that a regeneration should occur was made prior to the power outage, the regeneration still will take place upon restoration of power. As will be described, values for other important variables used in the execution of the control program also are stored in the EEPROM 44 for this reason.

When the leading edge probability P[le] remains greater than the leading edge threshold for the prescribed period of time, the state machine implemented by microcomputer 42 makes a transition to state 92. Upon this transition, the minimum value of the conductivity ratio is stored in the EEPROM 44. While in state 92, the microcomputer 42 uses each new value of the current ratio $I_R^2$ to calculate the probability of the height of the current ratio pulse P[rh], probability of a trailing edge P[te] and the probability of exhaustion P[ex] as follows:

$$P[rh] = \frac{\text{Maximum Current Ratio}}{3 \text{ (Minimum Current Ratio)}}$$

$$P[te] = \frac{\text{Maximum Current Ratio} - \text{Present Current Ratio}}{\text{Maximum Current Ratio} - \text{Minimum Current Ratio}}$$

$$P[ex] = P[rh] \, P[te]$$

If the value of P[rh] is greater than one, it is set equal to one; and when P[rh] is less than a height threshold e.g. 0.45), it is set equal to zero. The current ratio pulse height probability P[rh] and the trailing edge probability P[te] both use the minimum and maximum current ratio values measured since the last regeneration. Instead of using the maximum ratio value to calculate P[rh] and P[te], a moving average computed since the last resin bed regeneration can be employed. The use of a moving average precludes spurious spikes in the ratio waveform from significantly affecting the regeneration trip point.

It has been found that when the probability of exhaustion P[ex] exceeds an exhaustion threshold (e.g. 0.38) the hardness front is probably passing the bottom conductivity probe 48. Because P[ex] is calculated by multiplying P[rh] and P[te], it is apparent that the greater the value of the current ratio pulse height probability P[rh], the smaller the trailing edge probability P[te] needs to be to get the value of the exhaustion probability P[ex] above the exhaustion threshold. This corresponds to the uncertainty of detecting a trailing edge when there has been a small increase in the ratio. The point where the value of P[ex] exceeds the exhaustion threshold (ET) is indicated by the dashed line in FIG. 6.

The microcomputer 42 waits at state 92 until the probability of exhaustion P[ex] exceeds the exhaustion threshold (e.g.P[ex]>0.38). At that time, the state machine in FIG. 4 makes a transition to state 93 where the microcomputer waits to insure that P[ex] remains above the exhaustion threshold for a specified period of time, for example four hours. State 93 insures that a spurious event does not cause P[ex] to momentarily exceed the exhaustion threshold and initiate regeneration of the resin bed 14. If the value of the probability of exhaustion P[ex] drop below the exhaustion threshold during this waiting period, a transition occurs back to state 92. When P[ex] remains above the exhaustion threshold for the specified period of time at step 93, the state machine makes a transition to state 94. Upon this transition, the present maximum current ratio value is achieved in EEPROM 44.

Before making the transition to state 94, the microcomputer 42 calculates the running average of the current ratio pulse height probability P[rh] for the last four service cycles. The microcomputer compares this average to the most recent value of P[rh] of the present service cycle. If P[rh] of the present service cycle is less than a given percentage (e.g. 22.5%) of the running average, the microcomputer 42 illuminates a reduced capacity indicator lamp 59. This lamp provides a visual indication to the user that either the brine in the brine tank 36 has a low salt concentration, the resin 14 has reduced softening capacity, or a fault exists which prevents the full concentration of brine from entering the softening tank 12. The reduced capacity indicator lamp 59 also is illuminated if the probability of a current ratio pulse height probability P[rh] for the present service cycle is less than 0.55, for example.

While in state 94, the microcomputer 42 sends an active signal on line 54 in FIG. 2 to the valve control clock and timer 56. This signal indicates that the resin bed has become exhausted to the point where about twenty percent of its capacity to soften water remains and regeneration should occur soon. However, the control valve clock and timer 56 does not immediately initiate regeneration upon the receipt of an active signal on line 54, but rather waits until a specified time of day (e.g. 2 a.m.) when minimum water consumption normally occurs. Waiting until such time of minimum consumption is desirable as the regeneration process opens the first service valve 24 connecting the hard water inlet line directly to the outlet line, sending untreated hard water directly to the downstream apparatus which utilize the normally softened water. The valve control clock and timer 56 may be a conventional mechanical device, such as that supplied by Autotrol Corporation cited above, which has been modified for the present system by providing a solenoid that responds to a signal on line 54 by operating a latch which enables an internal clock to initiate regeneration at the appropriate time of day. Thus regeneration will occur at the desired time of day after the conductivity measurements indicate near depletion of the resin bed.

When both of these events occur, the valve control clock and timer 56 begins rotating the cam shaft 58 which operates the valves 24, 26, 30, 32, 38 and 39 illustrated in FIG. 1 through the stages of the regeneration process described previously. Initiation of the regeneration process by the valve control clock and timer 56 causes a closure of normally open service switch 52 providing an input signal to the microcomputer 42 indicating that regeneration is in progress. The valve control clock and timer 56 also has a mechanism that is operable by the user to manually initiate the regeneration cycle. Such manual activation of the valve control clock and timer 56 also produces a closure of the service switch 52. As manual operation can occur when the microcomputer 42 is in any of the six states shown in FIG. 4, a closure of the service switch 52 forces the microcomputer 42 to make a transition to step 95 at which it remains while regeneration is in progress.

During the regeneration cycle, while the microcomputer is in state 95, the signals from the two conductivity probes 47 and 48 continue to be sampled by the interrupt routine depicted in FIG. 5. Instead of using the conductivity ratio while in this state, the microcomputer 42 utilizes the squared total current from one of the probes as determined at step 82 of the interrupt routine. The current from either of the two conductivity probes 47 or 48 may be used at this point. After each execution of the sampling interrupt routine, the microcomputer determines whether the current from the selected probe is the maximum or minimum value of current occurring during state 95. This is accomplished by comparing the new current sample to previously stored minimum and maximum values during the regeneration state 95. If the new value is lower than the current minimum value or greater than the previously stored maximum value, the appropriate memory location is updated with the new value. Whenever one of the two values is updated, the microcomputer calculates the ratio of the maximum value to the minimum value ($I_{max}/I_{min}$). At the onset of the regeneration cycle at state 95, this ratio will be equal or very close to unity as the conductivity of the resin bed and the water in the tank 12 will not change significantly. However, as the concentrated brine is withdrawn from tank 36 and enters the softener tank 12, the conductivity within the softener tank rises dramatically. When the current ratio exceeds a value of 1.9, for example, a flag within the memory of the microcomputer 42 is set to indicate that the brine has entered the softener tank.

At the completion of the regeneration cycle, the valve control clock and timer circuit 56 mechanically opens the service switch 52 providing a signal to the microcomputer 42 that the regeneration has completed. At this time, the microcomputer checks the flag memory location to determine whether brine had entered the tank during the regeneration process. If this flag is not set, which indicates that the conductivity during regeneration did not rise significantly, the microcomputer 42 sends an active signal to a no salt indicator lamp 59 which provides a visual indication to the user that either the salt 33 in the brine tank 36 has been used up or that a fault exists which prevents the brine solution from entering the softener tank 12.

The regeneration process comprises flowing brine from tank 36 through the resin bed 14 for a given interval and then rinsing water through the resin bed for another interval to remove the brine. In the system described above, these intervals are determined by the valve control clock and timer 56 in a conventional manner. Alternatively the sensed conductivity of the resin bed can be used to determine when to terminate the rinsing. When the brine flows into the resin bed 14, the currents through the conductivity probes 47 and 48 rise dramatically and remain at a high level until the brine is flushed from the softening tank 12. Therefore, the current from one of the probes, preferably the lower probe 48, can be sensed during the rinsing process. When the current from that probe drops below a given level, rinsing is terminated after a short delay period which insures the brine has been flushed from the portion of the bed 14 below the probe (e.g. 48) being used. The latter technique reduces the amount water used to rinse the softening tank 12 as compared to purely timer based techniques, as well as returning the softener into service sooner.

When the regeneration process terminates, the microcomputer does not immediately make a transition from the regeneration state 95. Even though the resin bed 14 has been rinsed for a long period of time during the regeneration process, pockets of concentrated brine may remain within the resin bed 14, which can adversely affect the conductivity measurements by probes 47 and 48. Therefore, the microcomputer 42 remains in the regeneration state 95 for four or more hours after the service switch 52 has opened. This delay allows any remaining pockets of brine to be removed by the normal water flow through the softener tank 12 as well as by distribution within the softener tank. After the microcomputer 42 has waited at state 95 for this period of time after the service switch has opened, a transition is made to state 90 where the cycle is repeated by the microcomputer waiting for another leading edge in the conductivity ratio waveform.

During the operation of the water softener controller 40, should the conductivity ratio fall below 0.78 or exceed 100, a determination is made that one of the two conductivity probes has failed or become extremely contaminated. Upon such an occurrence, the microcomputer 42 sends a signal to one of the indicator lamps in set 59 which provides a visual indication to the user of this failure. When a probe fails in this manner, regeneration is never initiated based on conductivity as the ratio does not rise and fall. Therefore, an override is provided so that regeneration occurs periodically (e.g. every fourth day) if the conductivity measurements do not produce regeneration.

The transitioning of the state machine from one state to another has been described as occurring when certain parameters traverse specified threshold values. The threshold values given herein are used in the preferred embodiment of the water softener controller. However, other values for these thresholds will produce satisfactory operation of the controller without departing from the inventive concept of the present invention.

The invention being claimed is:

1. A water treatment system comprising:
   a tank having an inlet and an outlet, and containing a particle bed;
   first and second sensors located at two locations in the particle bed to sense electrical conductivity at each location;
   means, connected to said sensors, for deriving a ratio value representing a ratio of electrical conductivities sensed at the two locations;
   a source of first and second threshold values;
   a first means for determining whether the ratio value received from said means for deriving is less than all previous ratio values produced since a given point in time, to identify a minimum ratio value designated RATIO$_{min}$;
   a first means, responsive to said first means for determining and said means for deriving, for producing a first probability by dividing the ratio value by RATIO$_{min}$;
   a first comparator, coupled to said source and said first means for producing, to generate an indication when the first probability becomes greater than the first threshold value;
   a second means, responsive to the indication from said first comparator, for determining whether the ratio value received from said means for deriving is greater than all previous ratio values occurring after the indication was generated, to identify a maximum ratio value designated RATIO$_{max}$;
   a second means, responsive to said second means for determining and said means for deriving, for producing a second probability by dividing the ratio value by RATIO$_{max}$;
   a second comparator, coupled to said source and said second means for producing, to detect when the second probability becomes less than the second threshold value; and
   a mechanism, coupled to said first and second comparators, to regenerate the particle bed of the water treatment system in response to the first probability becoming greater than the first threshold value followed by the second probability becoming less than the second threshold value.

2. The water treatment system as recited in claim 1 further comprising a means connected to one of the first and second sensors for producing, in responsive to a sensed electrical conductivity, an indication whether a regenerant has entered said tank.

3. The water treatment system as recited in claim 1 wherein said mechanism responds to the regeneration control signal by initiating regeneration of the particle bed at a predefined time of day.

4. The water treatment system as recited in claim 1 wherein each of said first and second sensors comprises two spaced apart electrodes; and an ion exchange material encasing the electrodes to separate the electrodes from the particle bed.

5. The water treatment system as recited in claim 4 wherein each electrode is a metallic member plated with a noble metal.

6. The water treatment system as recited in claim 4 wherein each electrode is formed of graphite.

7. A water treatment system comprising:
   a tank having an inlet and an outlet, and containing a particle bed;
   first and second pairs of electrodes with each pair being placed at a different height in the particle bed;
   a signal generator having an output at which is produced an alternating signal having a given frequency, and having a conductor connecting the output to one electrode of each of said first and second pairs of electrodes;
   means, connected to the other electrode of each of said first and second pairs of electrodes, for producing a ratio value corresponding to a ratio of a signal S1 produced from said first pair of electrodes and a signal S2 produced from said second pair of electrodes;
   a first means for determining whether the ratio value received from said means for producing is less than all previous ratio values produced since a given point in time to identify a minimum ratio value designated RATIO$_{MIN}$;
   an analyzer, coupled to said means for producing and to said first means for determining, to compare the result of dividing ratio values by RATIO$_{min}$ to a first threshold and to generate an indication when the first threshold is exceeded by the ratio value;
   a second means, responsive to the indication from said comparator, for determining whether the ratio value received from said means for producing is greater than all previous ratio values produced, after the indication was generated, to identify a maximum ratio value designated RATIO$_{max}$;
   a calculator, coupled to said means for producing and to said first and second means for calculating a probability P according to the expression:

$$P = \left( \frac{RATIO_{max}}{n(RATIO_{min})} \right) \left( \frac{RATIO_{max} - Ratio}{RATIO_{max} - RATIO_{min}} \right)$$

where n is a non-zero constant;
   a control means, coupled to said calculator, for comparing the probability to a second threshold and producing a regeneration control signal when the probability is below the second threshold; and a mechanism connected to said control means to regenerate the particle bed in response to the regeneration control signal.

8. The water treatment system as recited in claim 7 wherein said means for producing a ratio value includes a means for digitally sampling periodically the signals S1 and S2 and calculating the ratio of samples of each signal to produce the ratio value.

9. The water treatment system as recited in claim 7 wherein said signal generator is a Walsh sine wave summer.

10. The water treatment system as recited in claim 7 further comprising a first current to voltage converter having an input connected to the other electrode of the first pair of electrodes and having an output at which signal S1 is produced; and a second current to voltage converter having a input connected to the other electrode of said second pair of electrodes and having an output at which signal S2 is produced.

11. The water treatment system as recited in claim 7 wherein each of said first and second pairs of electrodes comprises two spaced apart members plated with a noble metal and the members being encased in an ion exchange material.

12. A method for controlling the regeneration of a particle bed in a water treatment system, steps of which comprise:
occasionally measuring the conductivity of the particle bed at one location to produce a first conductivity measurement;
occasionally measuring the conductivity of the particle bed at another location to produce a second conductivity measurement;
deriving a ratio of the first and second conductivity measurements;
producing a first probability by dividing the ratio by a minimum ratio value;
producing a second probability by dividing the ratio by a maximum ratio value; and
regenerating the particle bed in response to the first probability becoming greater than a first threshold followed by the second probability becoming less than a second threshold.

13. The method as recited in claim 12 further including the step of determining whether a ratio has a minimum value of all ratios calculated since a previous regeneration of the particle bed and if so, retaining the ratio as the minimum ratio value.

14. The method as recited in claim 12 further comprising the step of determining whether a ratio has a maximum value of all ratios calculated since a previous regeneration of the particle bed and if so, retaining the ratio as the maximum ratio value.

15. The method as recited in claim 12 further comprising the steps of determining from one of the first and second conductivity measurements whether a regenerant has been added to the particle bed; and indicating to a user when a determination is made that the regenerant has not been added to the particle bed.

16. The method as recited in claim 12 wherein the step of regenerating the particle bed includes waiting until a predefined time of day to initiate regeneration of the particle bed.

17. The method as recited in claim 12 wherein the step of regenerating the particle bed includes rinsing the particle bed with water in which the rinsing is terminated in response to one of the first and second conductivity measurements.

18. The method as recited in claim 12 wherein the step of regenerating the particle bed includes determining whether brine has entered the particle bed in response to conductivity measurements.

19. A method for controlling the regeneration of a particle bed in a water treatment system, steps of which comprise:
occasionally measuring the conductivity of the particle bed at one location to produce a first conductivity measurement;
occasionally measuring the conductivity of the particle bed at another location to produce a second conductivity measurement;
deriving a ratio of the first and second conductivity measurements;
producing a first probability in response to a relationship between the ratio and a minimum ratio value;
determining when a first probability is within a first defined range of values, and thereafter;
producing a second probability in response to a relationship between the ratio and both the minimum ratio value and a maximum ratio value; and
regenerating the particle bed when a second probability is within a second defined range of values.

20. The method as recited in claim 19 wherein the step of producing a first probability P[1] does so according to the expression:

$$P[1] = \frac{\text{Present Current Ratio}}{k(\text{Minimum Ratio Value})}$$

where k is a non-zero constant.

21. The method as recited in claim 19 wherein the step of producing a second probability comprises:
producing a first intermediate probability P[i1] according to the expression:

$$P[i1] = \frac{\text{Maximum Ratio Value}}{n(\text{Minimum Ratio Value})}$$

where n is a non-zero constant;
producing a second intermediate probability P[i2] according to the expression:

$$P[i2] = \frac{\text{Maximum Ratio Value} - \text{Ratio}}{\text{Maximum Ratio Value} - \text{Minimum Ratio Value}} \text{; and}$$

the second probability is produced by multiplying the first and second intermediate probabilities.

22. The method as recited in claim 19 wherein:
the step of determining requires that the first probability remain within the first defined range of values for a predetermined period of time; and
the step of regenerating the particle bed requires that the second probability remain within the second defined range of values for a predefined period of time.

23. The method as recited in claim 19 wherein the step of regenerating the particle bed includes waiting until a predefined time of day to initiate regeneration of the particle bed.

24. The method as recited in claim 19 wherein the step of regenerating the particle bed includes rinsing the particle bed with water in which the rinsing is terminated in response to one of the first and second conductivity measurements.

* * * * *

UNITED STATES PATENT AND TRADEMARK OFFICE
CERTIFICATE OF CORRECTION

PATENT NO. : 5,234,601

DATED : August 10, 1993

INVENTOR(S) : Donald R. Janke et al.

It is certified that error appears in the above-identified patent and that said Letters Patent is hereby corrected as shown below:

In column 13, line 59, insert --first and-- before "second means".

In column 13, lines 61-62, replace the phrase "by dividing the ratio value by" with --that is a function of the ratio, $RATIO_{min}$ and--.

In column 15, replace lines 40-41 with the following paragraph: --producing a second probability in response to a relationship between the ratio and both the minimum ratio value and a maximum ratio value; and--.

Signed and Sealed this

Nineteenth Day of April, 1994

Attest:

BRUCE LEHMAN

Attesting Officer

Commissioner of Patents and Trademarks